April 22, 1924.

S. SORENSEN

BOILER TUBE SCALER

Filed Aug. 22, 1922

WITNESSES
Oliver W. Holmes
Robert I. Halsizer

INVENTOR
Stephen Sorensen
BY Munn & Co
ATTORNEYS

Patented Apr. 22, 1924.

1,491,640

UNITED STATES PATENT OFFICE.

STEPHEN SORENSEN, OF PORT RICHMOND, NEW YORK.

BOILER-TUBE SCALER.

Application filed August 22, 1922. Serial No. 583,614.

*To all whom it may concern:*

Be it known that I, STEPHEN SORENSEN, a citizen of the United States, and a resident of the city of New York, borough of Richmond, Port Richmond, in the county of Richmond and State of New York, have invented a new and Improved Boiler-Tube Scaler, of which the following is a full, clear, and exact description.

This invention relates to a boiler tube scaler, and has for an object the provision of a simple, strong, durable device which can be readily inserted and manipulated within the tubes of a boiler to easily and quickly remove deleterious material from the inside and outside thereof.

Another object resides in the provision of means whereby a high-speed compressed air operated device is continually hammering the walls of the tube into which the device is inserted, and in the provision of means whereby the exhaust of the compressed air assists in the blowing out of the loosened material from the pipe or tube.

A further object resides in the particular construction and arrangement of parts which are hereinafter described and claimed and shown in the accompanying drawings.

The invention is illustrated in the drawings, of which—

Figure 1:
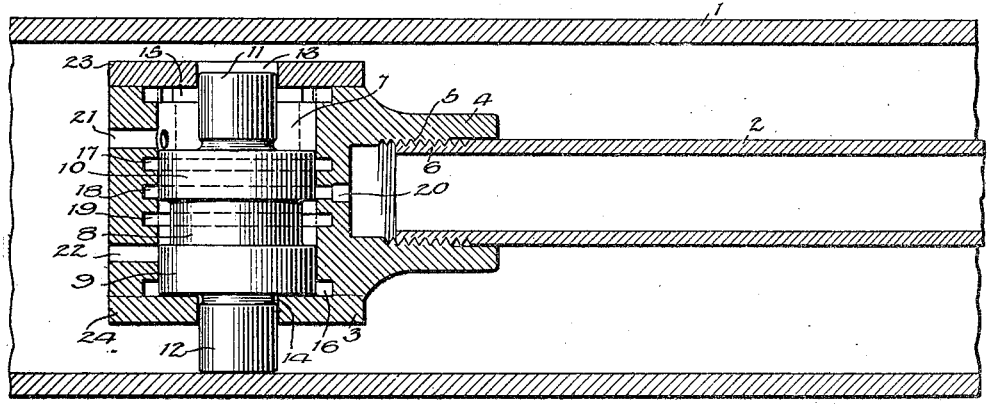
Figure 1 is a longitudinal section taken through a tube and the device.
Figure 2:
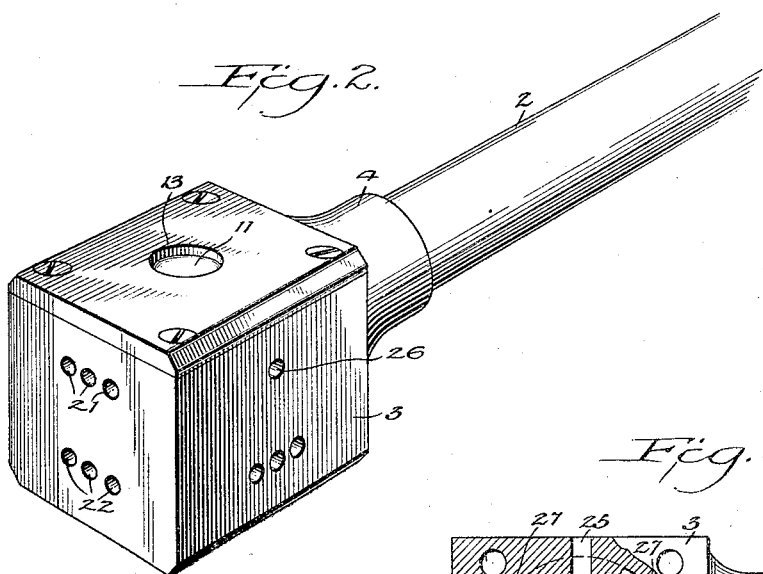
Fig. 2 is a perspective view of the device.

The form of the invention shown in the drawings is a preferred form, although it is understood that modifications in the construction and arrangement of the parts and in the character of the materials used may be adopted without departing from the spirit of the invention.

The invention contemplates the provision of a metallic head within which is formed a cylinder with a suitable inlet and exhaust port. Within this cylinder there is mounted a reciprocating plug having extensions adapted to extend from the ends of the cylinder and act as hammers to engage with the walls of the tube or pipe into which the head is inserted to knock deleterious material therefrom. This head and cylinder are attached to the end of a smaller pipe, which can be connected to a suitable source of operating fluid, such as compressed air, whereby the piston within the cylinder is reciprocated at high speed and automatically reverses at this speed. The pipe carrying the compressed air may be used and manipulated by hand to push the head into the pipe and remove it therefrom and to turn it around while within the pipe or tube.

To this end, the invention as illustrated in the drawings shows a tube 1 into which a pipe 2 is inserted. On the end of this pipe there is fastened a head 3 which has an integral sleeve 4 thereon having a threaded bore 5 into which the threaded end 6 of the pipe 2 is inserted.

The head 3 is provided with a transversely disposed cylindrical space 7 within which a piston 8 is adapted to reciprocate. This piston is of a diameter smaller than that of the cylinder and is provided with annular flanges 9 and 10 fitting snugly within the cylinder. The ends of the piston are provided with longitudinal extensions 11 and 12 which function as hammers to engage with the walls of the pipe or tube 1 as the piston reciprocates at high speed under the influence of the propelling fluid, such as compressed air. These hammers extend respectively through apertures 13 and 14 formed in the end walls of the head at the end of the cylindrical space 7. Between the end walls of the head and the ends of the bore or cylindrical space 7 I provide spaces 15 and 16 cylindrical in formation but of larger diameter than that of the cylinder 7. Formed in the walls of the cylinder 7, midway of its length, I provide three annular grooves 17, 18 and 19, the middle one 18 of which is connected to the inlet port 20 leading from the pipe 2. In the walls of the cylinder 7, preferably opposite the inlet port 20, I provide two groups of outlet ports 21 and 22 arranged three in a group, although any other number can be provided.

Figure 3:
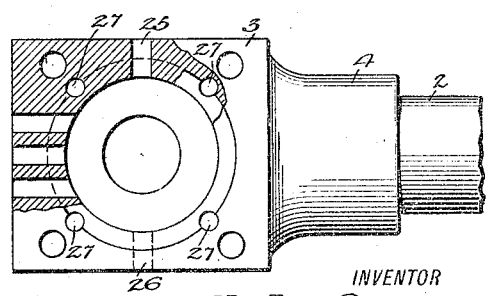
Fig. 3 is a plan view with certain parts in section.

The end walls of the head 3 are preferably formed by placing over the head plates 23 and 24 preferably fastened thereto by any suitable means. I also provide other outlet ports, such as 25 and 26, disposed in the walls of the cylinder at right angles to the outlet ports 21 and 22. Extending respectively from the groove 17 and the groove 19 to the chambers 15 and 16 are arranged a plurality of longitudinal grooves 27, as shown particularly in Fig. 3. These grooves provide passage for the fluid from one side of the flanges 9 and 10 to the other side thereof through the operation of the piston.

In the operation of the device, assuming the piston in the position shown in Fig. 1, in the cylinder 7 fluid flows through the pipe 2 into the inlet port 20; it then passes beneath the lower edge of the flange 10, which is ever so slightly spaced from the lower edge of the groove 18, and enters the space between the two flanges 9 and 10. It also passes into the groove 19 and thence through the grooves 27 and the space 16 at the end of the piston and therein impinges against the lower edge or face of the flange 9, forcing the piston upwardly. As the piston moves upwardly from the position shown in Fig. 1, the lower edge of the flange 9 passes the lower edge of the exhaust port 22, thus exhausting the air from beneath the flange 9. As the lower edge of the flange 10 passes above the lower edge of the groove 17 it opens the mid chamber between the flanges 9 and 10 to the groove 17 and permits the air to flow therefrom into the upper set of grooves 27, whereby the air can flow into the chamber 15 in front of the flange 10 and thereby cushion its force toward the end of its stroke. As the piston reaches the other end of its stroke, the operation is repeated in a reverse direction. As this piston moves back and forth at high speed, the hammers 11 and 12 strike the walls of the pipe or tube 1, knocking material therefrom both on the inside and outside. The high pressure exhaust in a plurality of directions from the head also blows material out of the pipe.

In this manner I provide a simple, efficient, strong and durable device which can be readily inserted and manipulated within a tube to remove the boiler scale therefrom.

What I claim is:

A device for removing scale from boiler tubes, which comprises a head to be disposed within the tube, said head having a cylinder therein, a reciprocating piston within said cylinder, and hammer portions on opposite ends of said piston extending through the head during the movement of the piston to engage with the walls of the tube and remove the scale therefrom, the outer surfaces of the head from which the hammer portions extend being flat to provide a clearance space between the head and the curved walls of the tube, in which space the hammer portion can move to achieve an effective blow on the walls of the tube.

STEPHEN SORENSEN.